Sept. 12, 1944.  C. T. RAY  2,357,847
TRACTOR ATTACHMENT
Filed Jan. 11, 1941  6 Sheets-Sheet 1
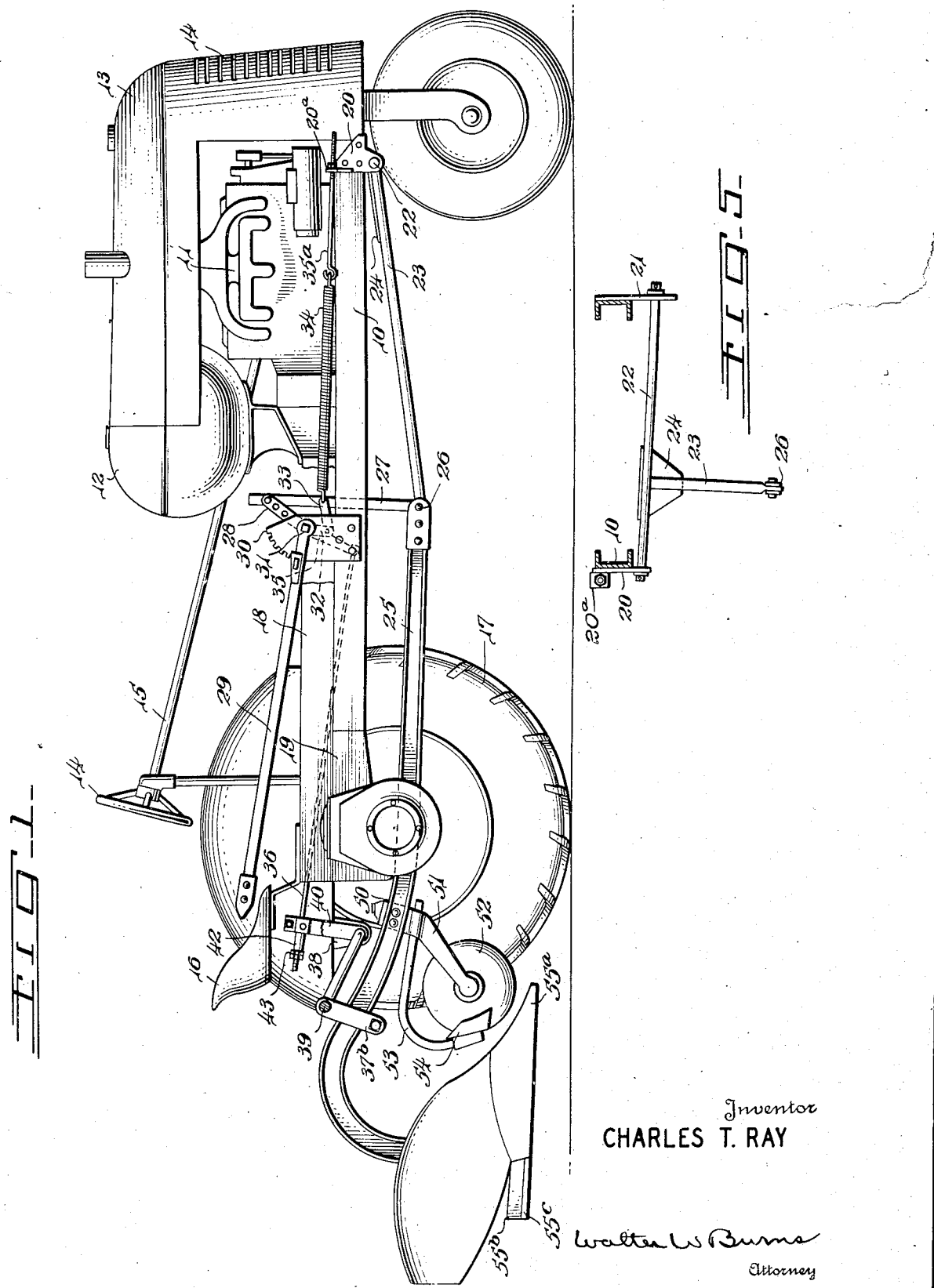
Inventor
CHARLES T. RAY
Walter W Burns
Attorney

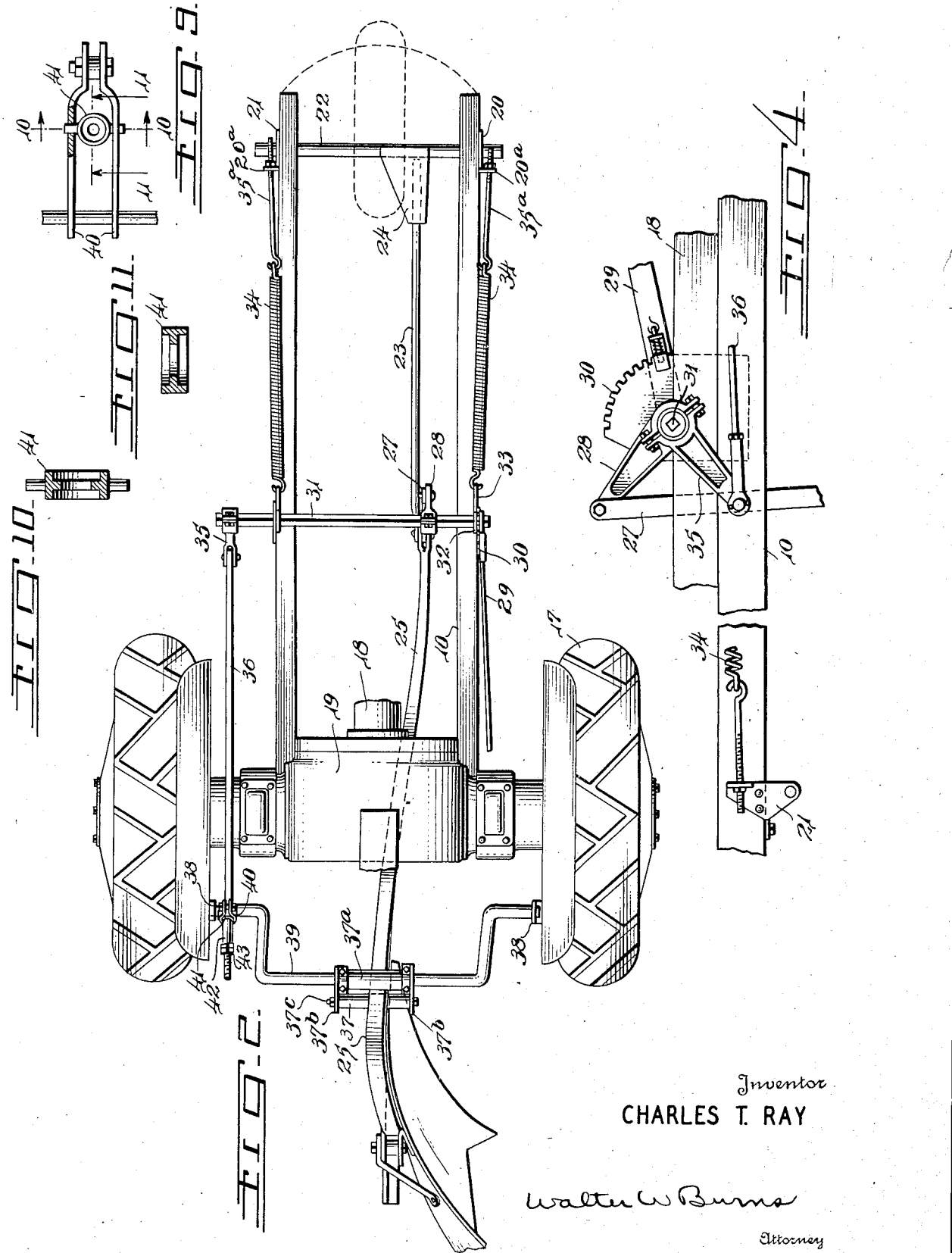

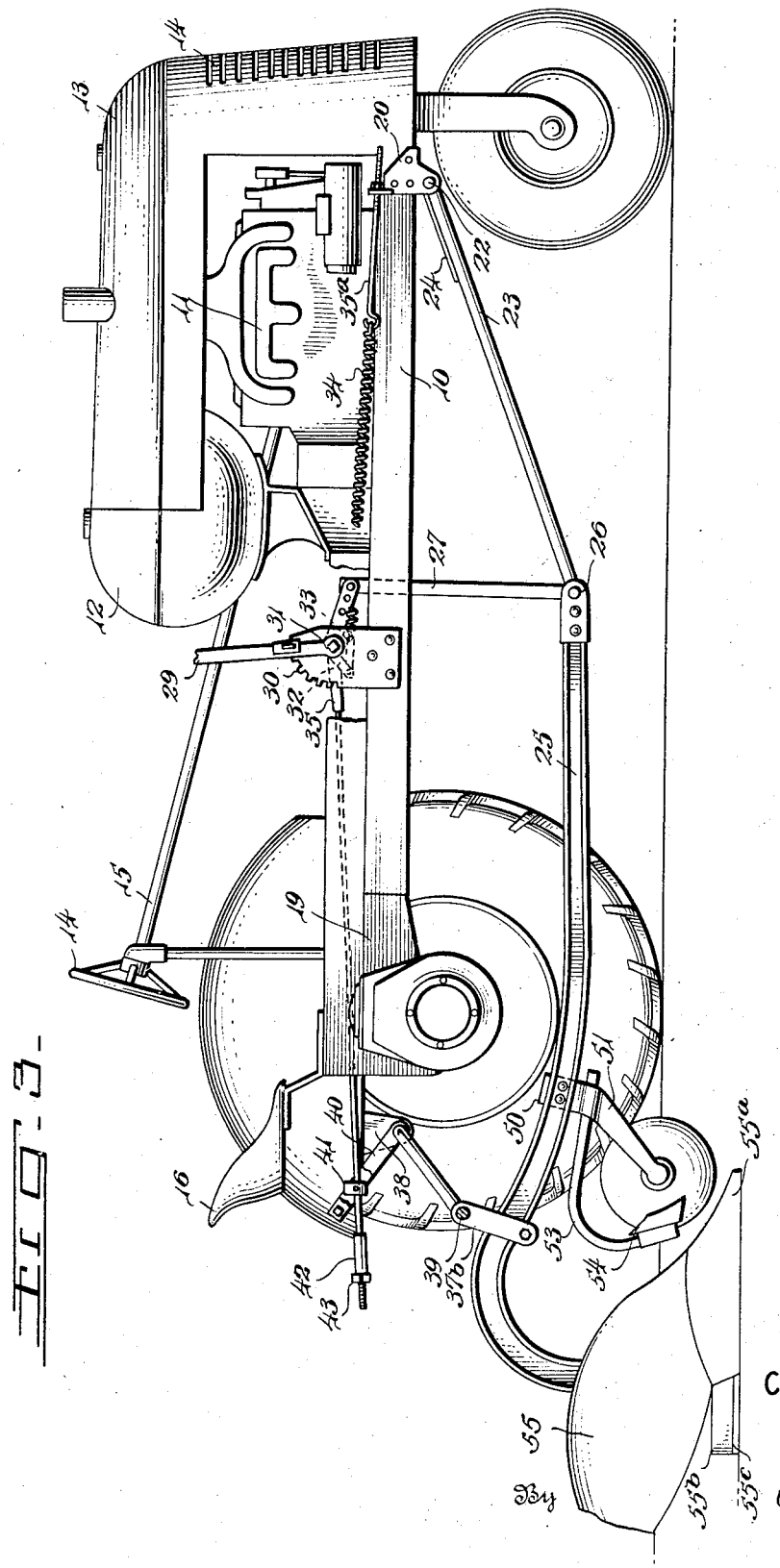

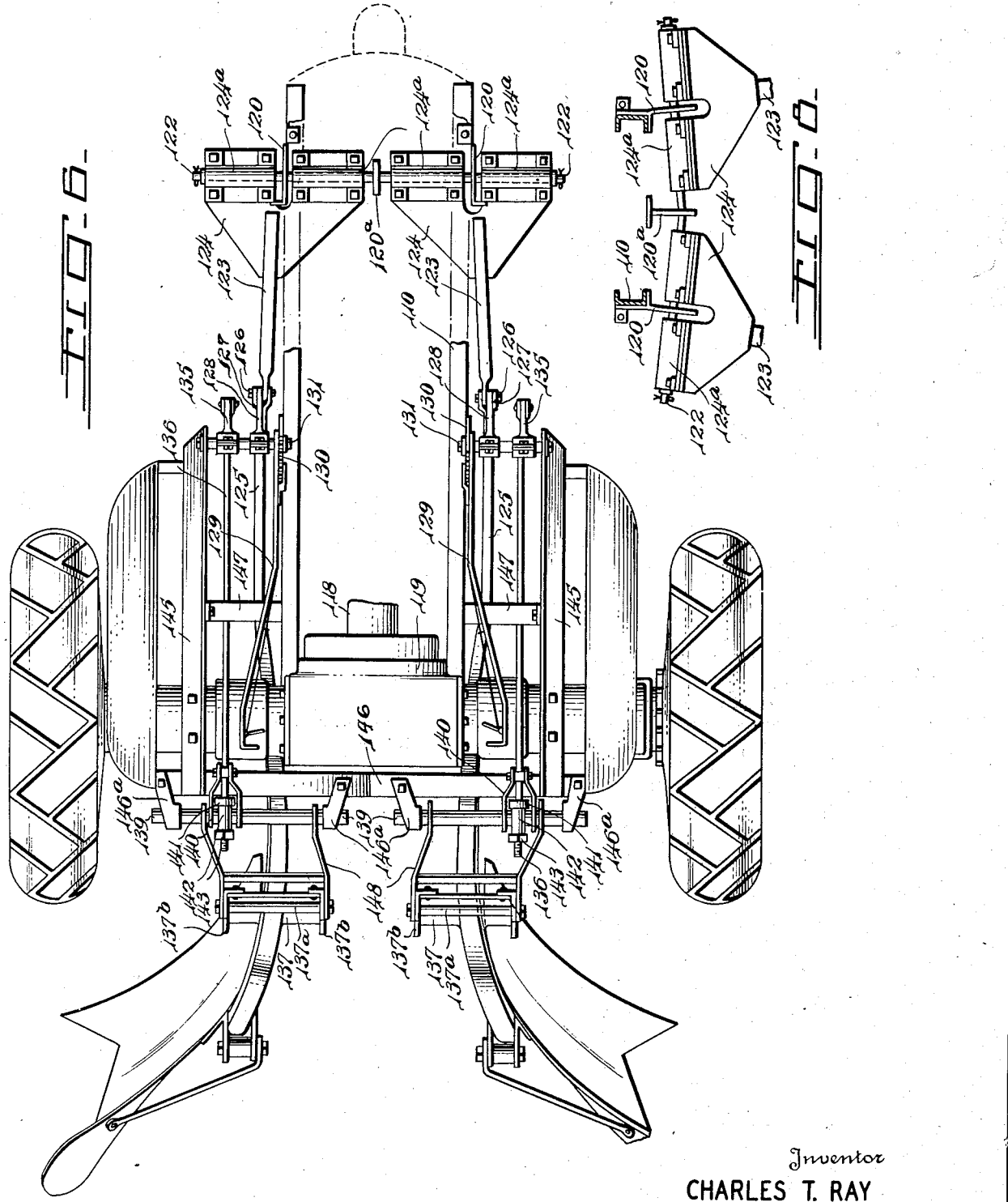

Sept. 12, 1944.　　　C. T. RAY　　　2,357,847
TRACTOR ATTACHMENT
Filed Jan. 11, 1941　　　6 Sheets-Sheet 5

Inventor
CHARLES T. RAY

By Walter W. Burns
Attorney

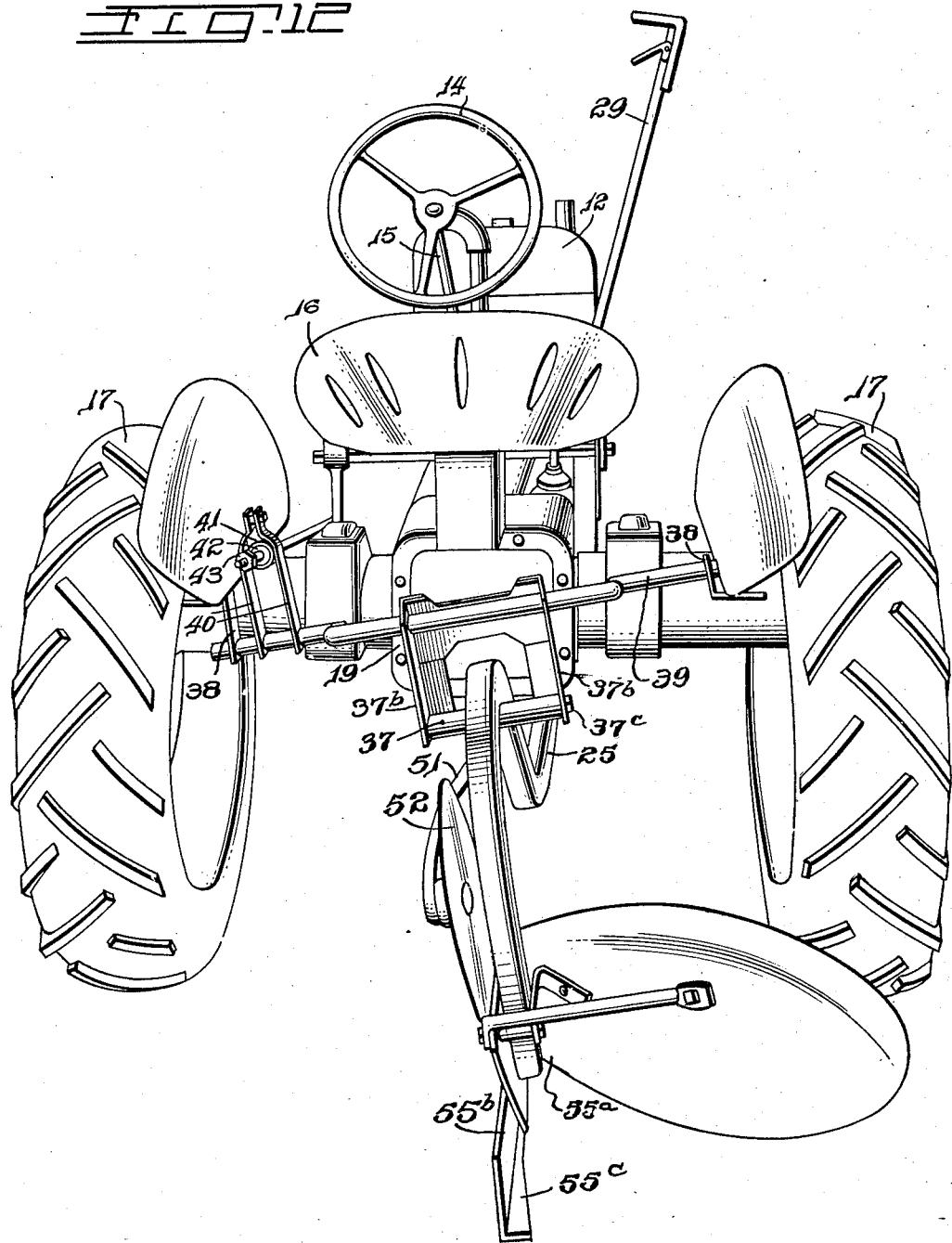

Patented Sept. 12, 1944

2,357,847

UNITED STATES PATENT OFFICE 2,357,847

TRACTOR ATTACHMENT

Charles T. Ray, Louisville, Ky., assignor to B. F. Avery and Sons Company, Louisville, Ky., a corporation of Delaware Application January 11, 1941, Serial No. 374,127

5 Claims. (Cl. 97—47)

This invention relates to plows and has particular relation to those plows which may be attached to and detached from tractors.

In using plows with tractors for power it is very important that the plow be as close as possible to the wheels of the tractor in order that complete control of the furrow may be had due to the more nearly complete control of the plow in its sidewise movement and so that irregularities in the consistency of the earth traversed cannot throw the plow out of its predetermined path.

It is further very desirable in using a plow that its depth be controlled by the shape of the plow and the height of the forward end of the beam while plowing and not by any pressure either in an upward direction or downward direction applied to the plow itself—in other words, that the plow be pulled through the ground and its depth controlled entirely by the height of the forward end of the beam.

It is further desirable in a plow of this type that a readily controlled means be provided to move the forward end of the plow beam to a higher or lower position relative to the ground surface, when the plow is in the ground, without lifting any of the weight of the plow bottom or any earth in which it may be embedded.

It has further been found to be desirable to provide a single means which will not only guide the forward end of the plow beam to a higher and lower position when the plow is in the ground but will also lift the whole plow clear of the ground surface after it has been guided out of the ground.

It has been found to be still further desirable to provide a means for properly entering such a plow into the ground so that when at the proper depth, it will be at the proper angle and with the least possible expenditure of power.

It has also been found to be desirable to provide a tractor plow which while guided by its forward end will move freely up and down, will also have its up and down movement confined substantially to a vertical plane.

It has also been found to be desirable to provide a tractor plow which will have a pair of plow members, each of which may be operated independently, each having forward draft means and guide means to permit free movement of the rear portion of the plow in a plane, the forward draft means and rear guide means being constructed to support the plow for movement in a plane inclined relative to the vertical so that in the plowing operation, the plow will be vertical.

To accomplish the above results are objects of this invention.

Referring now to the drawings wherein I have illustrated my invention,

Fig. 1 is an elevation view from the right side of a tractor equipped with my invention adjusted for road transport, certain parts being broken away or omitted for the sake of clearness.

Fig. 2 is a plan view of the structure illustrated in Fig. 1, parts being broken away or omitted.

Fig. 3 is a view similar to Fig. 1 but showing the plow in the ground instead of above the ground.

Fig. 4 is a fragmentary view of the left side of the tractor equipped with my invention, showing a part of the left side of the depth control and lifting mechanism in road or transport position.

Fig. 5 is a fragmentary view of the draft bar shaft at the forward end of the draft bar, illustrating its angularity relative to the horizontal.

Fig. 6 is a plan view of the frame of a tractor with an adaptation of the invention wherein a right hand plow and a left hand plow are illustrated, parts being broken away and omitted in the interest of clearness.

Fig. 8 is a detail front view of the draft bars and coacting parts as viewed from the front.

Figure 7:
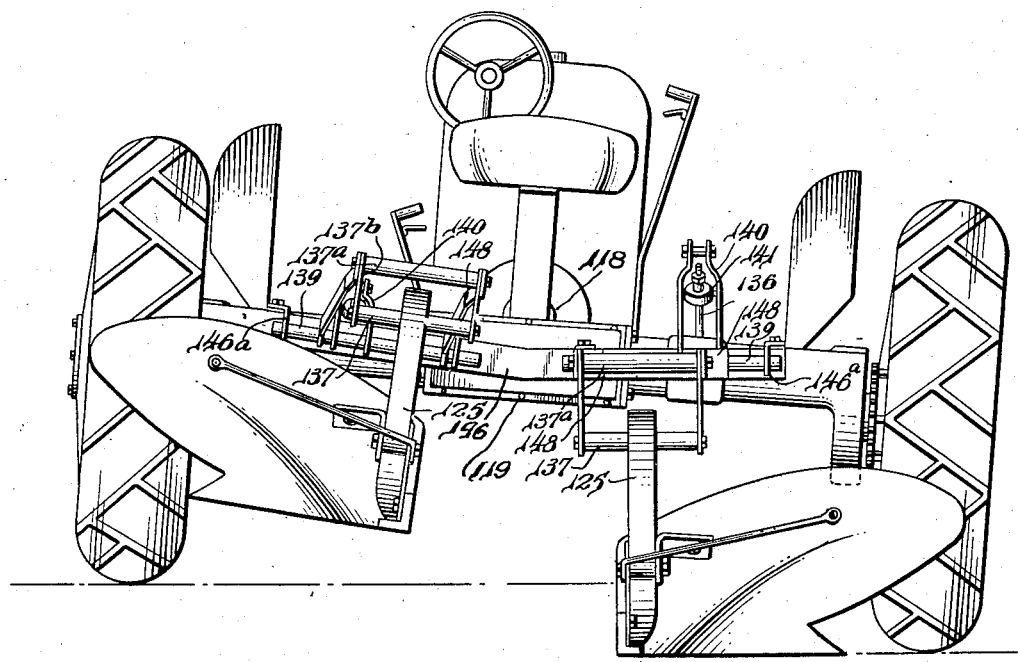
Fig. 7 is a rear elevational view of the two-plow modification illustrated in Fig. 6.

Figs. 9, 10 and 11, are detail views of the plow lifting-lever arm and coacting parts, the two latter figures being taken on the respective sectional lines 10—10 and 11—11 of Figure 9.

Fig. 12 is a rear view of the structure of Figs. 1 to 3.

Similar reference characters refer to the same or similar parts throughout the specification and drawings.

Referring particularly to Figs. 1, 2 and 3, 10 designates the frame of a tractor having an engine 11, a gasoline tank 12, a water reservoir 13 for a radiator behind the grille 14. Forward and beneath the frame 10 is a steering wheel unit which is controlled through suitable and well known worm and gear mechanism (not shown) by the steering wheel 14 and its shaft 15. On the rear portion of the frame is a seat 16 which is occupied by the operative when the tractor is in use. Rear wheels 17 are provided, which support the rear portion of the tractor and provide the traction with the ground. These wheels 17 are driven through suitable transmission mechanism from the engine 11. In Fig. 1, the rear wheel has been omitted from the showing to avoid confusion and to permit illustration of portions of the invention located between the wheels.

Extending from the engine toward the rear of the tractor is the transmission shaft housing 18 which carries the shaft which operates the gearing in the housing 19.

The rear end construction of the illustrated tractor is of the bridge type with the bottom of the transmission gear housing above the axis of the wheels as illustrated. This provides extra space for the operation of the implement as will later be made clear.

The present invention relates to turning plows and is designed for use with and for attachment to a tractor. Its method and means of attachment place it in the class of direct-connected implements as distinguished from those implements which have carrying wheels. The implement herein described is a plow and has no carrying wheels and when in transport position is carried bodily by the tractor as will be later described in detail.

The plow, itself, which is described herein, is similar to the conventional walking plow which latter is provided with a beam of proper length to be drawn or pulled by horses and with handles for controlling the plow. By removing the handles of the ordinary plow, it could be attached in a manner to be described and would work perfectly as in the present invention the main functions of the tractor during the plowing operation are (1) to pull the plow, keeping the forward end at a predetermined height and (2) keep the plow in substantially the same plane—permitting it to move upwardly and downwardly as determined by the position of the forward end and taking the torsional strains incident to any tendency to move out of the predetermined plane.

The principles upon which this instant invention operates are those of the true draft which has always been sought by the farmer with his horse pulling the plow forward and slightly upwardly against the reaction of the earth being displaced by the plow. With the farmer at the rear of the plow simply keeping the plow in a vertical plane, the depth of the furrow being determined by the height of the horse, the length of the traces and the adjustment of the clevis, a minimum amount of work is needed to pull the plow through the ground.

Applying these principles to the tractor-attached plow, there are bearing bracket plates 20, 21 (see Fig. 5) attached to the forward portion of the tractor frame 10. Between these bearing plates and journaled therein is a shaft 22 which, as shown in Fig. 5, is mounted at the same angle to the tractor frame 10 as the frame is placed to the horizontal, when one wheel of the tractor is in the furrow during plowing. This places the shaft 22 in a substantially horizontal position during the plowing operation.

Rigid with the shaft 22 is a draft bar 23 which is secured firmly to the shaft by a brace plate 24. the draft bar 23 extends rearwardly and downwardly and at its rear end is secured the plow beam 25 as at 26. It is the height of the pivot pin 26 above the ground which controls the depth of the furrow as will be later made clear.

In order to control the height of the pivot pin 26 at the forward end of the plow beam, there is a substantially vertical forward lifting link 27 connected at its lower end to the pivot 26 and at its upper end to an arm 28 of a lifting and control lever 29. The lifting lever 29 is supported at one end on a quadrant plate 30 by the square shaft 31 which shaft is supported at its opposite end in a corresponding plate on the opposite frame member 10. The lifting lever 29 is provided with the usual grip-controlled dog which registers with notches of the quadrant 30.

In order to counterbalance the weight of the plow when being lifted, as will be later described, I provide a counterbalance mechanism which tends to assist the lever 29 to be moved to its rearward position. On the shaft 31, a lever arm 32 is provided, at the outer end of which is connected a link 33 to which in turn is connected a counterbalance spring 34. At the other end of the counterbalance spring 34 is a hook 35a which is screw-threaded at its end and adjustably connected to and through an outwardly extending ear 20a on the bracket plate 20. A similar counterbalance mechanism is mounted on the opposite side.

On the shaft 31 is also mounted a lever arm 35 which has pivotally connected at its outer end a rear-end lifting rod 36. The rod 36 extends rearwardly and is connected for one way operation with the lifting mechanism which will now be described.

The plow beam at its under side has a long cylindrical bearing 37 which is suitably secured to the plow beam as by welding. Mounted on a straight portion of the bell crank lever 39 is a bearing member 37a having downward extending link members 37b rigid therewith. These link members 37b carry a shaft 37c which passes through the lower ends of the link members 37b and the cylindrical member 37 to pivotally connect these members together. The members 37, 37a, 37b and 37c, form a link bail frame connection between the bell crank member 39 and the plow beam 25 whereby the plow beam may be lifted by the bell crank lever.

With the rigid connection between the bearing member 37a and the link members 37b, any tendency to sidewise movement will be resisted and with the rigid connection between the plow beam and the bearing member 37 together with the rigid link bail frame 37a, 37b, any tendency to torsional movement will be counteracted. The operating result of this construction is that the movements of the plow will be confined to a plane perpendicular to the axis of rotation of the bell crank 39.

Mounted in bearings as at 38 in Fig. 2, is the bell crank lever 39 having an operating lever 40 rigidly secured thereto. This lever 40 comprises two spaced members between which is a ring 41 having trunnions journaled in the spaced members of the operating lever 40.

The rearwardly extending rod 36 passes through the trunnioned ring and carries a sleeve 42 which is held in place by the two nuts 43. From this construction it will be clear that if the bell crank lever 39 does not force the ring 41 against the sleeve 42, the rod 36, sleeve 42 and nuts 43 may move rearwardly without having any tendency to move the operating lever 40 or the bell crank lever 39. The purpose of this construction will be brought out in the description of the operation as a whole.

Secured to the plow beam 25 is a bracket 50 in which is secured a spindle of a coulter frame 51. A roller coulter 52 is pivoted on the lower end of the coulter frame 51 and is in position to assist the plow in opening a clean furrow. Rigidly mounted on the coulter frame is a jointer bracket 53 having at its end a jointer 54. As the coulter and jointer are not a part of this invention per se, they have, for the purpose of clearness been omitted from some of the figures of the drawings and will not be further described.

It is to be noted that the bracket 38 on the left side of the machine is lower than the corresponding bracket on the right side of the machine. This is to tilt the plow relative to the tractor frame so that when the tractor has one wheel in the furrow, the plow will be substantially in a vertical plane.

The plow illustrated in Figs. 1 and 2 will throw the earth to the right. The plow has a mould board 55, a plow bottom 55a, and a land side 55b rigid with the plow bottom. The land side extends rearwardly and its heel slide 55c is removable so as to be readily replaced when worn. The plow when in working position in the ground is carried by the heel slide which runs in and has a flat surface in contact with the bottom of the furrow.

The operation of the invention as a whole is as follows: In broad terms, the forward end of the plow is provided with means for adjusting the forward end of the beam vertically and exerting a forward pull. When the operative is ready to plow, he starts his tractor forward and moves the lifting lever 29 from its position in Fig. 1 toward the position of Fig. 3.

The first result of this action is the lowering of the lifting link 27 and the forward end of the plow beam 25 and the corresponding lowering of the rear end of the draft bar 23. Simultaneously during the first part of the movement, the lifting rod 36 moves rearwardly, lowering the plow until the plow point reaches the ground. Further movement of the lifting rod 36 rearwardly, moves the sleeve 42 away from the trunnion ring 41 and the rear of the plow is free for up and down movement. As the tractor moves the plow forward, the plow point will continue its downward movement until the land side 55b and its heel slide 55c rest upon the bottom of the furrow. When the bottom of the plow is parallel to the surface of the ground, the downward movement will cease and we have the true draft condition. If for any reason the height of the forward end of the plow beam 25 is changed, the plow point will guide the plow up or down as the case may be until a state of stability is reached. By knowing in what notch the lifting lever dog has to be placed to produce a predetermined depth of furrow, it is only necessary to lock the lifting lever at this point to produce the required depth of furrow. With the shaft 22 and the bell crank shaft 39 mounted on inclined parallel axles, the lowering of the right side of the tractor by the entry of the right wheel in the furrow will bring the plow to a substantially vertical position, as already pointed out.

The lifting bail link frame and connecting parts, 37, 37a, 37b and 37c, prevent sidewise and torsional movement and at the same time permit free up and down movement of the plow.

When it is desired to raise the plow from the ground, it is not necessary to put any lifting force on the rear portion of the plow. It is only necessary to use the lifting and control lever 29 as a control lever, moving the same backwards to raise the front end of the plow beam 25 by raising the link 27, at the same time moving the lifting rod 36 forward until the sleeve 42 reaches the trunnion ring 41 but not far enough to exert lifting pressure on the plow.

The forward movement of the tractor with the plow point pointed at an upward incline, brings the plow out of the earth. If desired, further movement of the lever 29 causes it to function as a lifting lever and both front and rear ends of the plow are lifted clear of the ground.

In the two-plow model of this invention as illustrated in Figs. 6, 7 and 8, there are two plows, side by side, one right hand and the other left hand.

In this modification, the tractor frame 110, the shaft housing 118, the gear case 119 correspond respectively to the parts 10, 18 and 19 already described. In this modification, it is necessary to reverse the wheels in order to obtain a wider space between the wheels, thus making the overall width of the tractor somewhat greater.

At the forward end of the tractor frame 110 are a pair of bracket plates 120 and an intermediate bracket plate 120a spaced mid-distance between the two plates 120. An axle 122 is mounted in the bracket plates 120, 120a and is in the form of a flat V as illustrated in Fig. 8. On this axle are journaled a pair of draft plates 124 to which draft bars 123 are attached as by welding. A pair of bearing members 124a conform to the shape of the axle 122 and are bolted to the draft plates 124 as illustrated in Fig. 6.

The draft bars 123 extend rearwardly to pivots 126 to which are pivoted the forward ends of the plow beams 125 and the lower ends of the lifting links 127. The upper ends of the lifting links 127 are connected to the respective lifting arms 128 mounted on and rigid with the square shafts 131. The square shafts 131 are supported on bearing plates, two on the frame members 10 and two at their outer ends which are secured on an auxiliary frame, to be later described. One of the bearing plates is provided with the quadrant 130. A lifting lever 129 is mounted on the square shaft 131 and has the usual grip-operated dog or latch to coact with the teeth of the quadrant to hold the lever 129 in any one of the adjusted positions corresponding to the teeth of the quadrant. These levers 129 serve as lifting levers for the respective plows when the plows are above ground and as control levers when a respective plow is in the ground as already described for the lever 29.

On each shaft 131 there is mounted a lifting arm 135 outward of the arm 128. Connected to its outer end is a lifting rod 136. The rear ends of these lifting rods are connected to the operating lever 140. The construction of this operating lever is similar to the construction of the operating lever 40 which with its connections is illustrated in Figs. 9, 10 and 11. The operating lever 140 is provided with a trunnion ring 141. The rods 136 extend through the rings 141 and are provided with sleeves 142 and nuts 143. The operation of the individual plows and the connection, operating and controlling parts is the same as that already described for the plow illustrated in Figs. 1 and 2. However, there are some differences in construction made necessary by the duplication of the plows. These differences will now be described.

The type of tractor illustrated is one wherein the wheels may be reversed on the hub and the lateral wheel base made narrow or wide as desired. In the use of the two-plow attachment the wheels of the tractor are applied in a manner to give maximum width.

In order to support the shafts 131 and the rear lifting mechanism to be described, there is provided an auxiliary frame having two longitudinal members 145, preferably of angle-iron and a third transverse member 146 connecting the rear ends of the frame members 145 together. The frame member 146 is of a flat V-shape at an angle corresponding to the angle of the forward draft axle 122 which is shown in Fig. 8. The construction and angle of the rear frame member is shown in Fig. 7. The frame members 145 are connected to the tractor as by braces 147 and to the rear end gear housing 119. Mounted on the rear frame member 146 are brackets 146a in which are journaled the rock shafts 139. These rock shafts 139 carry the operating arms 140 already described and also the lifting arms 148, each pair of which being suitably braced together to form two rigid structures on respective shafts 139. As in the case of the cylindrical bearing member 37 already described, there is a cylindrical member 137 secured, as by welding, to the under side of each plow beam 125 to which are pivoted two link members 137b. These form link frames with the braces which hold them together and are pivoted to the lifting arms 148 by the bolts or rods 137a. Since the operation of the parts is similar to the operation of the corresponding parts of the structure of Figs. 1 and 2, the details of operation of the individual plows, is omitted.

The angularity of the positions of mounting on the frame, is opposite as already noted. The double plow enables the operative to start the length of the field to be plowed, using one plow, then by reversing direction and raising that plow, he may place the other in the ground and complete the plowing of the field with back and forth plowing in one dimension of the field. It will be noted that because of the opposite angularity, the plow being used will always be substantially in a vertical position as the adjacent wheel will always be in the furrow and consequently at a lower level.

While the invention has been illustrated and described somewhat in detail, it is to be understood that the disclosure is merely illustrative and that modifications and changes may be made without departing from the spirit of the invention and within its scope as claimed.

Having described my invention what I claim is:

1. A tractor plow attachment comprising a plow having a forwardly extending beam, an elongated draft member having its forward end pivotally connected to the forward end of the tractor and its rear end pivotally connected to the plow beam and its rear end extending to substantially a mid-position between the forward and rearward ends of the wheel base, adjustable means for supporting and adjustably fixing the height of the forward end of the beam from the tractor and at any one of a plurality of heights, means connected to the rear end of the plow for raising and lowering the rear end when it is above the ground surface and means for releasing the raising and lowering means from operation when the plow is in plowing position, the raising and lowering means comprising means for confining the movement of the plow to a single plane when the plow is in working position.

2. A tractor plow attachment comprising a plow having a forwardly extending beam, an elongated draft member having its forward end pivotally connected to the forward end of the tractor and its rear end pivotally connected to the plow beam and its rear end extending to substantially a mid-position between the forward and rearward ends of the wheel base, adjustable means for supporting and adjustably fixing the height of the forward end of the beam from the tractor and at any one of a plurality of heights, means including a bearing, and spaced link members rigid with the bearing, for raising and lowering the rear end of the plow and confining its movement to substantially a single plane when in working position and means for releasing the raising and lowering means from operation when the rear of the plow is in working position whereby the rear end of the plow will seek a predetermined level as controlled by the height of the forward end of the beam.

3. A tractor plow attachment comprising a pair of right and left plows, each having a forwardly extending beam, separate draft bars for adjustably supporting and holding in place the forward ends of the respective plow beams, the forward ends of the draft bars having pivotal connections to the forward end of the tractor, the rear ends of the draft bars extending to substantially mid-positions between the front and rear of the tractor wheel base, means for independently supporting the rear ends of the respective plows and a connection between the front and rear supporting means for connecting the rear from the forward supporting means to lift both ends of the plow simultaneously when the rear of the plow is out of the ground and including a lost motion means to render the lifting connection to the rear inoperative when the plow is in operative plowing position.

4. A tractor plow attachment comprising a plow having a forwardly extending beam, a draft bar pivoted at its forward end to the forward end of the tractor at an angle to the horizontal and at its rear end to the forward end of the plow beam, the rear end of the draft bar being substantially midway between the front and rear of the tractor wheel base, pivoted means for supporting the rear of the plow, the axis of the pivoted means being at an angle to the horizontal and a single means to control the height of its front end only, when the plow is in the ground and to lift both ends when the plow is out of the ground.

5. A tractor plow attachment comprising a pair of plows, each having a forwardly extending beam, a draft bar pivoted at its forward end to the forward end of the tractor at an angle to the horizontal and at its rear end to the forward end of its plow beam, the rear end of the draft bar being substantially midway between the front and rear of the tractor wheel base, pivoted means for supporting the rear of each respective plow, the axis of the pivoted means being at an angle to the horizontal, and a single means for each plow to control the height of its front end only when the plow is in the ground and to lift both ends when the plow is out of the ground.

CHARLES T. RAY.